UNITED STATES PATENT OFFICE 2,553,696

METHOD FOR MAKING WATER-SOLUBLE POLYMERS OF LOWER ALKYLENE IMINES

Alexander L. Wilson, Upper Montclair, N. J., assignor, by mesne assignments, to Union Carbide and Carbon Corporation, a corporation of New York No Drawing. Application January 12, 1944, Serial No. 517,987

5 Claims. (Cl. 260—239)

This invention relates to N,N-(1,2 alkylene) 1,2 alkylene polyamines and to a method of making them from 1,2 alkylene imines, as in the formation of N,N-ethylene ethylene diamine,

from ethylene imine.

As early as 1888 it was discovered that viscous, nondistillable, sticky residues resulted from prolonged heating of ethylene imines in water solution (Gabriel, Berichte 21, 1052). It has also been proposed to employ acids and salts as agents to promote the polymerization of ethylene imines in the formation of viscous to waxy polymerization products. As far as is known such products are mixtures of compounds of high molecular weight which are unresolvable into identifiable constituents.

The new compounds of this invention may be represented by the general formula:

in which R stands for a lower 1,2 alkylene group or radical and $n$ is a small whole number. These compounds are characterized by the presence therein of a primary amine group, —$NH_2$, and a tertiary, amino nitrogen atom, :N—, which is present in a 1,2 alkylene imine ring, R:N—, that is, a three membered ring in which the imino nitrogen atom is attached to adjacent carbon atoms of the alkylene group. Additionally, the compound may contain one or more secondary amine groups, —NH—, where $n$ has a value larger than 1. Specific examples of such compounds are:

$C_2H_4$:$NC_2H_4NH_2$,N,N-ethylene ethylene diamine, the dimer of ethylene imine $C_2H_4$:$NC_2H_4NHC_2H_4NH_2$,N,N-ethylene diethylene triamine, the trimer of ethylene imine $C_2H_4$:$N(C_2H_4NH)_2C_2H_4NH_2$,N,N-ethylene triethylene tetramine, the tetramer of ethylene imine $(CH_3)C_2H_3$:$NC_2H_3(CH_3)NH_2$,N,N-(1,2 propylene) 1,2 propylene diamine, the dimer of propylene imine $(CH_3)C_2H_3$ : $NC_2H_3(CH_3)NHC_2H_3(CH_3)NH_2$,N,N-(1,2 propylene) di 1,2 propylene triamine, the trimer of propylene imine $(CH_3)C_2H_3$ : $N(C_2H_3(CH_3)NH)_2C_2H_3(CH_3)NH_2$,-N,N-(1,2 propylene) tri 1,2 propylene tetramine, the trimer of propylene imine $(CH_3)_2C_2H_2$ : $NCH(CH_3)CH(CH_3)NH_2$,N,N - (2,3 butylene) 2,3 butylene diamine, the dimer of 2,3 butylene imine The compounds are colorless, limpid, low boiling liquids which have a strong ammoniacal odor. They are highly reactive, being only slightly less reactive than the alkylene imine monomer to which they are related, and are useful for producing polymers and alkylene polyamine derivatives. For instance, they polymerize readily in the presence of water. The polymerization is favored by the presence of acids and strongly inhibited by the presence of inorganic bases. In the absence of water in effective amounts, they may be polymerized by heat alone, at temperatures generally above 200° C. In addition to exhibiting the reactivity characteristics of primary, secondary and tertiary amines, they react readily with ammonia, amines and acids and may be polymerized alone or with acids and the like to yield high molecular weight products which are useful as textile assistants and as modifiers of synthetic plastics.

The N,N-alkylene alkylene polyamines of this invention may be prepared by reacting a water-soluble alkylene imine in an aqueous solution which is moderately alkaline, followed by rapid removal of the desired reaction product from the water. In the first stage of the procedure, that is, in the formation of the compounds, the reaction conditions are so selected as to favor a narrowly restricted degree of reaction, namely low proportion of water, a low temperature for reaction, absence of acid catalyst or the presence of alkaline inhibitor. In the second or following stage the reaction is quenched by the addition of an alkaline base. The desired reaction product or products are then separated or recovered from the reaction mixture in a substantially anhydrous state. The preferred procedure in the latter stage of the preparation is to add to the aqueous reaction mixture a sufficient amount of an alkali metal hydroxide, for instance, sodium hydroxide, preferably in solid form, to cause the reaction mixture to separate into two liquid layers. The upper layer is then removed mechanically and dried by adding solid sodium hydroxide or other alkali metal hydroxide, or a concentrated solution thereof, and distilled. As an alternative the amine reaction product may be extracted from the reaction mixture using benzene or some other non-aqueous extractant which is non-reactive. The extraction is carried out preferably after quenching the reaction by the addition of alkali, and the amine product may be recovered from the resulting extract by distillation under conditions favoring the rapid removal of residual water, or in the presence of additional alkali for drying, or a combination of such expedients.

The addition of sodium hydroxide or other alkali metal hydroxide to the reaction mixture has been found to be most effective in quenching the polymerization reaction. It is possible that such quenching action may result from an anti-catalytic effect exerted by the alkali metal hydroxide or by a reduction in the effective water concentration in the mixture, or both. In dilute aqueous solutions, even a small proportion of sodium hydroxide markedly inhibits the polymerization, while an amount of sodium hydroxide sufficient to give an alkali concentration corresponding to 50 per cent by weight, based on the aqueous hydroxide solution, is effective to prevent polymerization, substantially completely.

The invention may be illustrated further by the following examples:

Example 1

A solution of ethylene imine (9 per cent imine by weight) in water was stored at 0° C. for 5 months, an equal weight of flake sodium hydroxide was added and the unchanged ethylene imine content of the mixture distilled off. The residual oil layer was separated, dried first with sodium hydroxide and then with sodium and then fractionally distilled. From about 360 parts by weight of the original ethylene imine the following products were recovered:

| | Parts by weight |
|---|---|
| Ethylene imine | 167 |
| Dimer B. P. 126–132° C. | 82 |
| Trimer B. P. 220–235° C. | 34 |
| Tetramer | 14 |

It was necessary to free the dimer fraction of water by successive treatments with sodium hydroxide and a final distillation over sodium. Upon potentiometric titration the dimer gave two sharp end points and an equivalent weight of 43.4 (theoretical, 43.1). The tetramer fraction during a similar titration reacted as a compound containing four amine groups.

The trimer fraction on redistillation boiled at 114–115° C. at an absolute pressure of 4 millimeters. It showed a titration curve typical of a triacid base of an equivalent weight of 43±2 (theoretical, 43.1).

Example 2

An aqueous solution of propylene imine (25 per cent imine by weight) was allowed to stand at room temperature for 21 days. At the end of this time solid sodium hydroxide was added in quantity equal to the weight of the water present and the unreacted propylene imine was removed from the mixture by distillation. The residual oily layer was then fractionally distilled to yield the following cuts from 50 parts by weight of the original propylene imine.

| | Parts by weight |
|---|---|
| Propylene imine B. P. 66–85° C. | 27 |
| Dimer B. P. 120–144° C. | 16 |
| Trimer B. P. 212–215° C. | 2 |
| Liquid polymers residue | 1 |

The dimer, or N,N-(1,2 propylene) 1,2 propylene diamine, was thus produced at 70 per cent efficiency calculated on the quantity of propylene imine consumed. The trimer fraction was titrated potentiometrically showing inflections of a tri-acid base of equivalent weight 57.3 (theoretical, 57.1). Further acid was absorbed on standing to indicate more definitely the imine structure so that the compound was determined to be the trimer.

Example 3

A quantity of crude propylene imine was allowed to stand in water solution at room temperature for several days. Upon distillation a higher boiling amine amounting to about 15 per cent of the propylene imine recovered was obtained. After several rectifications this higher boiling amine fraction gave a cut boiling at 135–145° C. which titrated as a diamine of molecular weight 116 (theoretical, for the dimer of propylene imine, 114).

In general ethylene imine showed a greater tendency than propylene imine to polymerize beyond the lower members, i. e. the dimer, trimer and tetramer.

Example 4

A solution formed of 250 grams of ethylene imine (boiling range, 55–56° C.) and 250 grams of water was heated under reflux in a steam bath for 14 hours. The temperature rose from an initial boiling point of 85° to 95° C. The product was added to 250 grams of flake sodium hydroxide and a fraction of unreacted ethylene imine was removed by distillation at 55°–57° C. The residual supernatant layer of amines was extracted three times, using 300 milliliters of benzene. The extract was separated into the following fractions by careful rectification:

| Fraction | Boiling Point, °C. | Pressure, mm. | Weight, Grams | Amine Content, Grams | Yield, Per Cent |
|---|---|---|---|---|---|
| 1 | 55–57 | 743 | 60 | 59.5 | 24 |
| 2 | 125–135 | 743 | 41 | 41 | 16 |
| 3 | 105–120 | 20 | 24 | 24 | 10 |
| 4 | 120–145 | 3 | 16 | 16 | 6.4 |
| 5 | 160–180 | 3 | 9 | 9 | 3.6 |
| 6 | Intermediates | | 304 | 21 | 8 |
| 7 | Residues | | 67 | 67 | 27 |

Fraction 2 was redistilled to a boiling range of 126–133° C., and was the dimer. By potentiometric titration with normal hydrochloric acid, it was found to be a diacid base of equivalent weight 43.4 (theoretical, 43.1).

Yield: 16 per cent of N,N-ethylene ethylene diamine.

Example 5

A two-phase liquid composition was made up consisting of ethylene imine, 400 grams; sodium hydroxide, 40 grams; and water, 360 grams. After 32 hours under reflux at 67–77° C., a test distillation showed a negligible extent of polymerization. An additional 400 grams of water was added and heating was continued for 23 hours. The indicated proportion of ethylene imine polymerized was less than 5 per cent. The addition of 400 grams of water yielded a homogeneous solution and this was heated for 64 hours, the temperature being 89–95° C. After standing at room temperature for five days, the reaction product was added to 1000 grams of sodium hydroxide. A triple extraction with a total of 600 milliliters of benzene followed. The extract was fractionally distilled.

| Fraction | Boiling Point, °C. | Pressure, mm. | Amine Content, Grams | Yield, Per Cent |
|---|---|---|---|---|
| 1 | 63–85 | 740 | 110 | 27.5 |
| 2 | 125–140 | 740 | 61 | 15.2 |
| 3 | 165–175 | 740 | 7 | 1.1 |
| 4 | 105–125 | 23 | 17 | 4.2 |
| 5 | 105–200 | 2 | 38 | 9.5 |
| 6 | Intermediates | | 22 | 5.5 |
| 7 | Residue | | 16 | 4.0 |

Yield: 15 per cent of dimer, N,N-ethylene ethylene diamine.

Fraction 3 after redistillation boiled at 168–172° C. (theoretical, 170.5° C.), showed an equivalent weight of 61.0 (theoretical, 61.1) and was 2-aminoethanol.

*Example 6*

A freshly produced solution, containing by analysis 112 grams of propylene imine in 218 grams of water, was stored in glass for four days at room temperature. Flake sodium hydroxide, 200 grams, was added and the heterogeneous solution was separated and distilled. Distillation cuts were obtained in two operations as follows:

| Fraction | Boiling Point, °C. | Weight, Grams | Amine Content, Grams |
|---|---|---|---|
| 1 | 65–80 | 95 | 89.5 |
| 2 | 80–138 | 9.5 | 6.4 |
| 3 | 138–152 | 10 | 10 |
| 4 | Residues | 3 | 3 |

Fraction 3 was impure dimer, N,N-(1,2 propylene) 1,2 propylene diamine of an equivalent weight of 60.

Yield: 9 per cent of dimer.

*Example 7*

A solution of 50 grams of propylene imine in 150 grams of water was stored at room temperature for 21 days. After treatment with 150 grams of sodium hydroxide, the solution was directly distilled to a liquid temperature of 150° C. At this point the residual oily layer was separated and further rectified. The following fractions were obtained:

| Fraction | Boiling Point, °C. | Weight, Grams | Amine Content, Grams |
|---|---|---|---|
| 1 | 66–85 | 25.7 | 25.2 |
| 2 | 85–103 | | 1.8 |
| 3 | 110–138 | 5.5 | 4.9 |
| 4 | 139–144 | 9.5 | 9.5 |
| 5 | Residue | 3 | 3 |

Fraction 4 was indicated to be nearly pure dimer, N,N-(1,2 propylene) propylene diamine; equivalent weight 57.3 (theoretical, 57.1).

Yield: 19 per cent (crude yield 29 per cent) of dimer.

*Example 8*

A 37-gram sample of propylene imine of boiling range 65–69° C. was stored at room temperature in a glass-stoppered bottle for three years. It was then refluxed with a piece of sodium to remove traces of moisture present, and was carefully distilled as follows:

| Fraction | Boiling Point, °C. | Pressure, mm. | Amine Content, Grams |
|---|---|---|---|
| 1 | 65–70 | 742 | 4.4 |
| 2 | 70–140 | 742 | 0.8 |
| 3 | 140–147 | 742 | 10.1 |
| 4 | 73–90 | 3 | 10.4 |
| 5 | 120–200 | 3 | 5.9 |
| 6 | Residue | 3 | 2 |

Fraction 4, after rectification, proved to be the trimer of propylene imine; boiling point, 109–114° C. at 19 millimeters pressure. A potentiometric titration yielded the curves of a triacid base of equivalent weight 58±1 (theoretical, 57.1).

Yield: 28 per cent of trimer.

*Example 9*

A sample of 81.5 grams of propylene imine (boiling point 65–72° C.; imine 98.9 per cent) was heated under reflux for four hours with 81.5 grams of water, the temperature rising from 69° to 92° C. A second volume of water was added and heating continued for five hours; a third volume with heating for two hours to a final temperature of 99° C. The product was distilled without further treatment, yielding the following fractions:

| Fraction | Temperature Vapor Liquid | Pressure, mm. | Weight, Grams | Amine Content, Grams |
|---|---|---|---|---|
| 1 | 99°–100° C. | 740 | 100 | 0.3 |
| 2 | 100°–104° C. | 740 | 104 | 0.4 |
| 3 | 110° C. | 100 | 16 | 0.4 |
| 4 | 220° C. | 4 | 2 | 2.0 |
| 5 | Residue | 4 | 72 | 72 |

Fraction 5 was a light-colored, viscous water-soluble mass. The molecular weight, determined by the elevation of boiling point of a 4.6% solution in methanol, was 830.

Yield: 89 per cent of high polymer.

*Example 10*

A solution of 300 grams of ethylene imine in 900 grams of water was heated under reflux at 90–95° C. for exactly one hour. The product was then quickly cooled in an ice-bath. A 400-gram sample was removed and added at once to 300 grams of sodium hydroxide in flake form. The remainder of the product was rapidly heated and allowed to reflux for exactly one hour more. A second 400-gram sample was removed as before, and heating of the residue was continued for 22 hours. The final product was treated with 350 grams sodium hydroxide.

The three samples, obtained as indicated, were individually extracted with 200 milliliters of benzene. The extracts were dehydrated azeotropically and were fractionally distilled with the results shown in the following table:

| Fraction | | Runs | | |
|---|---|---|---|---|
| | | I | II | III |
| | Heating time, hr. | 1 | 2 | 24 |
| 1 | Monomer, g. (54°–100° C.) | 37.8 | 21.7 | 0.05 |
| 2 | Dimer, g. (100°–135° C.) | 16.3 | 9.3 | 0.1 |
| 3 | Polymers, g. (<200° C. at 2 mm.) | 23.5 | 22.8 | 0.5 |
| 4 | Higher Polymers | 16.3 | 41.5 | 91.3 |
| | Molecular Weight of Higher Polymers | 370 | 425 | 2,800 |

It will be seen from the foregoing examples of which Example 10 was carried out primarily for the purpose of preparing high molecular weight polymers of ethylene imine, that the formation of the dimers, trimers and tetramers of the lower alkylene imines may be favored by control of the reaction conditions maintained. I have found for instance that the pure alkylene imines alone or in non-aqueous solvents are relatively stable on aging or at temperatures up to about 200° C. In the presence of a few per cent of water, polymerization to the extent of several per cent per year occurs at room temperature. The rate of polymerization definitely increases with dilution down to at least about 10 per cent For example, a 50 per cent aqueous solution of ethylene imine polymerizes to the extent of about 71 per cent in 14 hours at its boiling point of 85°–95° C. At approximately the same temperature, a 25 per cent solution is already 78 per cent polymerized in 2 hours.

The dimer and trimer compounds of the lower alkylene imines are readily obtainable in relatively pure form. The tetramers are clearly identified as such, their wide boiling range indicates possible contamination by an isomeric compound. In the case of the dimer of ethylene imine, pure linear tetramer is obtained on polymerization.

The invention is susceptible of modification within the scope of the appended claims.

What is claimed is:

1. A process for making a water-soluble N,N-(alkylene) alkylene polyamine of the formula $R:N \cdot (R \cdot NH)_n \cdot H$ in which R is a lower alkylene group having adjacent carbon atoms thereof attached to the nitrogen atoms and $n$ is a small whole number less than four, which comprises forming an aqueous, non-acidic to moderately alkaline solution of a water-soluble, secondary lower alkylene imine and permitting said imine to polymerize therein, quenching the polymerization reaction by the addition of alkali to said solution, and separating the resulting water-soluble polymerization product from the reaction mixture.

2. A process for making a polymerization product of a water-soluble secondary, lower alkylene imine in which the imino nitrogen atom thereof is attached to adjacent carbon atoms which comprises polymerizing said imine in aqueous, non-acidic to moderately alkaline solution, and quenching the polymerization reaction by the addition of alkali metal hydroxide to said solution prior to the formation of water-insoluble polymers in substantial amount, and thereafter recovering the resultant water-soluble polymerization product from the reaction mixture.

3. A process for the polymerization of a water-soluble, lower alkylene, secondary imine in which the imino nitrogen atom thereof is attached to adjacent carbon atoms to a water-soluble polymer thereof containing not more than four molecules of said imine combined therein, which comprises forming an aqueous, non-acidic to moderately alkaline solution of said imine and heating said solution at a temperature not higher than the boiling point thereof to polymerize said imine, quenching the polymerization reaction by adding to said solution an amount of alkali metal hydroxide approximately equal to the water therein, by weight, prior to the formation of water-insoluble polymers in a substantial amount, and separating the water-soluble polymer from the resulting reaction mixture.

4. A process for making a water-soluble polymer of ethylene imine in which the imino nitrogen atom thereof is attached to adjacent carbon atoms which comprises forming an aqueous, non-acidic to moderately alkaline solution of said imine and polymerizing said imine therein, quenching the polymerization reaction by the addition of alkali to said solution, and separating the resultant water-soluble polymer from the reaction mixture.

5. A process for making a water-soluble polymer of 1,2 propylene imine which comprises forming an aqueous, non-acidic to moderately alkaline solution of said imine and polymerizing said imine therein, quenching the polymerization reaction by the addition of alkali to said solution, and separating the resultant water-soluble polymer from the reaction mixture.

ALEXANDER L. WILSON.

REFERENCES CITED

The following references are of record in the file of this patent:

UNITED STATES PATENTS

| Number | Name | Date |
|---|---|---|
| 471,520 | Majert | Mar. 22, 1892 |
| 511,303 | Majert | Dec. 19, 1893 |
| 2,136,094 | Wilson | Nov. 8, 1938 |
| 2,182,306 | Ulrich et al. | Dec. 5, 1939 |
| 2,212,146 | Berchet | Aug. 20, 1940 |
| 2,296,225 | Ulrich | Sept. 15, 1942 |

FOREIGN PATENTS

| Number | Country | Date |
|---|---|---|
| 435,388 | Great Britain | Sept. 20, 1935 |

OTHER REFERENCES

Jones et al., J. Organic Chem., March 1944, pp. 125–147.

Jones, J. Organic Chem., November 1944, pp. 484–499.

Ladenberg—Berichte, vol. 21, pp. 758–766.

Gabriel—Berichte, vol. 28, p. 2931.